United States Patent
Hyde et al.

(10) Patent No.: US 9,060,255 B1
(45) Date of Patent: Jun. 16, 2015

(54) ADAPTIVE INFORMATION SERVICE ACCESS

(75) Inventors: Caleb S. Hyde, Kansas City, MO (US); Clark Douglas Halferty, Lee's Summit, MO (US); Andrew Mark Wurtenberger, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 833 days.

(21) Appl. No.: 13/037,753

(22) Filed: Mar. 1, 2011

(51) Int. Cl.
*H04W 40/00* (2009.01)
*H04W 4/14* (2009.01)
*H04L 29/12* (2006.01)
*H04W 4/12* (2009.01)

(52) U.S. Cl.
CPC ............ *H04W 4/14* (2013.01); *H04L 61/1547* (2013.01); *H04W 4/12* (2013.01)

(58) Field of Classification Search
CPC ............... H04L 12/5895; H04L 51/38; H04L 29/06027; H04L 65/1069; H04L 29/06; H04L 65/1006; H04L 65/80; H04L 41/5012; H04W 4/14; H04W 4/12; H04W 4/18; H04W 4/16; H04W 88/184; H04W 76/02; H04W 88/16; H04W 4/00; H04W 92/02; H04W 40/00; H04W 92/06; H04W 8/18; H04M 15/68; H04M 2207/18; H04M 2207/20; H04M 3/53333
USPC ............. 455/428, 552.1, 556.1, 553.1, 414.1, 455/417, 466, 412.1, 412.2, 426.1, 445; 370/252, 351, 389
See application file for complete search history.

(56) References Cited

U.S. PATENT DOCUMENTS

| | | | |
|---|---|---|---|
| 6,104,790 A | 8/2000 | Narayanaswami | |
| 6,167,255 A | 12/2000 | Kennedy, III et al. | |
| 6,205,339 B1 | 3/2001 | Leung et al. | |
| 6,987,850 B1 * | 1/2006 | Watson | 379/265.02 |
| 7,068,643 B1 | 6/2006 | Hammond | |
| 7,236,574 B2 | 6/2007 | Haldeman et al. | |
| 7,649,877 B2 | 1/2010 | Vieri et al. | |
| 7,676,220 B2 | 3/2010 | Kuiken et al. | |
| 8,638,781 B2 * | 1/2014 | Lawson et al. | 370/352 |
| 2002/0069069 A1 | 6/2002 | Kanevsky et al. | |
| 2004/0012643 A1 | 1/2004 | August et al. | |
| 2005/0020268 A1 * | 1/2005 | Hosie et al. | 455/445 |
| 2006/0148495 A1 * | 7/2006 | Wilson | 455/466 |
| 2006/0203977 A1 | 9/2006 | Erhart et al. | |
| 2008/0039056 A1 | 2/2008 | Mathews et al. | |
| 2008/0075063 A1 * | 3/2008 | Ha | 370/351 |
| 2008/0305773 A1 * | 12/2008 | Hundscheidt et al. | 455/412.1 |

* cited by examiner

Primary Examiner — Olumide T Ajibade Akonai

(57) ABSTRACT

A communication system for providing access to an information service includes a communication interface and a processor. The communication interface is configured to receive a request for an information session between a communication device and a virtual destination identified in the request. The virtual destination is associated with service destinations that provide the information service. The processor is configured to select one destination from the service destinations based on a type of the information session. The service destinations include a voice platform and a text message platform and the type of the information session is a voice session or a text message session. The processor is also configured to initiate the information session between the communication device and the one destination.

19 Claims, 7 Drawing Sheets

| VIRTUAL DESTINATION | VOICE SERVICE AVAILABLE? | TEXT SERVICE AVAILABLE? | DESTINATION SELECTION PROCESS | DESTINATION |
|---|---|---|---|---|
| 800-555-1234 | YES | NO | BASED ON VIRTUAL DESTINATION | 555-555-2222 |
| 800-555-5678 | YES | YES | BASED ON VIRTUAL DESTINATION AND SESSION TYPE | 555-555-7777 (voice) |
| | | | | 555-555-8888 (text) |

FIGURE 6

ADAPTIVE INFORMATION SERVICE ACCESS

TECHNICAL BACKGROUND

Communication devices such as telephones are often used to obtain information from information services. A user of the communication device may wish to contact the information service to obtain a wide variety of information including a bank balance, an airline flight status, a weather update, a sports score, a stock price, or other types of information. The user may also wish to complete a transaction with the information service including paying a bill, making a purchase, making a technical support request, closing an account, or other type of transaction. These types of interactions may be accomplished through a voice conversation, a text based interaction which does not involve a voice interaction, or through other means.

Many information services like those described above provide toll free telephone numbers through which users may contact the information service. The toll free number typically allows the user to make calls to the information service at no additional cost to the user. Toll free numbers are typically virtual numbers in that they are not associated with a physical destination, device, or geographic location. When a toll free number is called, the communication system typically performs a lookup process. The lookup process translates the virtual toll free number to a geographic number associated with a geographic destination, device, or location. The operator of the information service may change the physical location to which the calls to a toll free number get routed without changing the toll free number itself.

Overview

A communication system for providing access to an information service includes a communication interface and a processor. The communication interface is configured to receive a request for an information session between a communication device and a virtual destination identified in the request. The virtual destination is associated with service destinations that provide the information service. The processor is configured to select one destination from the service destinations based on a type of the information session. The service destinations include a voice platform and a text message platform and the type of the information session is a voice session or a text message session. The processor is also configured to initiate the information session between the communication device and the one destination.

BRIEF DESCRIPTION OF THE DRAWINGS

FIG. 6 illustrates a decision table for use in selecting a destination.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
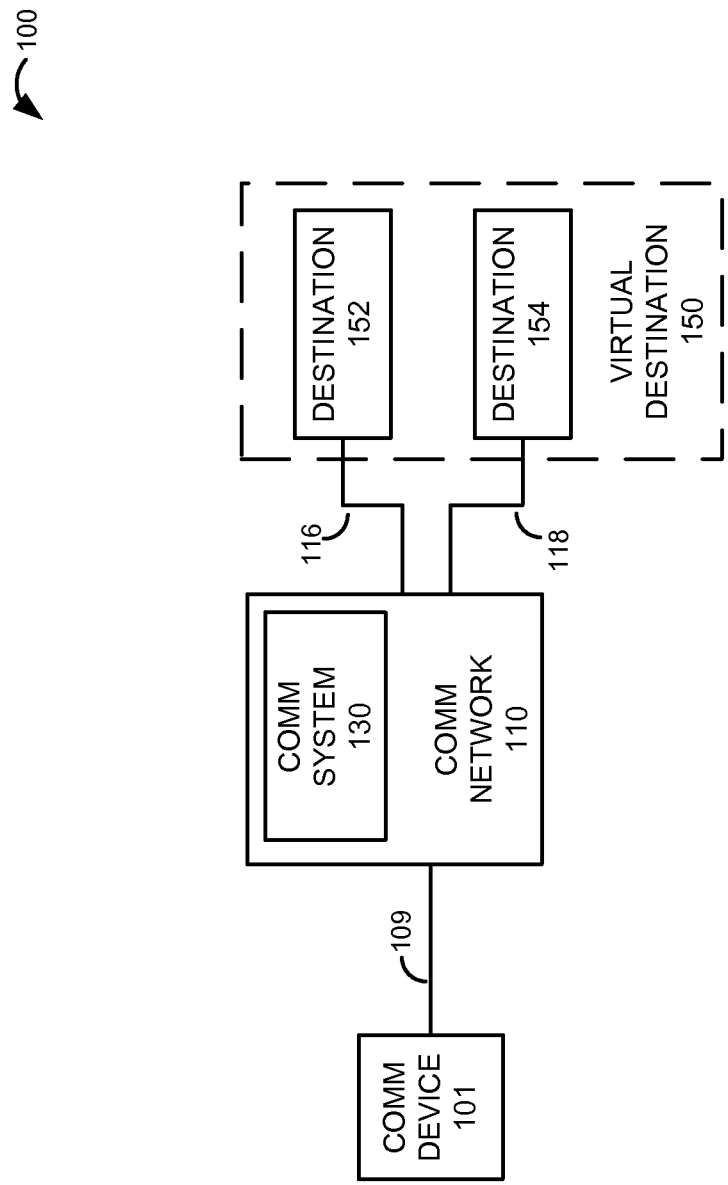
FIG. 1 illustrates a communication architecture.

FIG. 1 illustrates communication architecture 100. Communication architecture 100 includes communication device 101, communication network 110, and virtual destination 150. Communication network 110 comprises communication system 130. Virtual destination 150 is associated with destination 152 and destination 154. Communication device 101 and communication network 110 are in communication over communication link 109. Communication network 110 communicates with destination 152 and destination 154 over link 116 and link 118, respectively.

Figure 2:
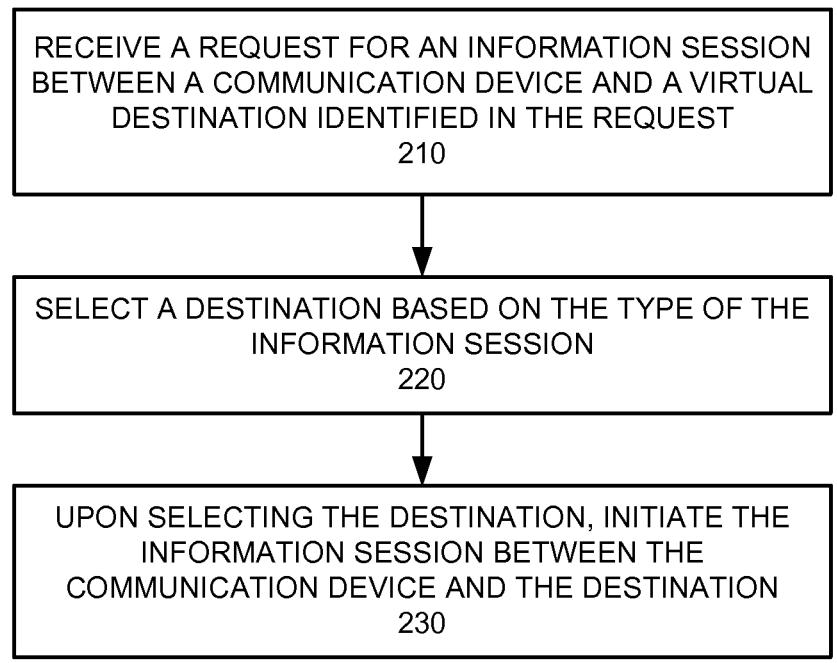
FIG. 2 illustrates an operation of a communication architecture.

FIG. 2 illustrates an operation of communication architecture 100. The steps of operation are indicated below parenthetically. Communication network 110 receives a request for an information session between communication device 101 and virtual destination 150 which is identified in the request (210). Communication system 130 selects from destination 152 and destination 154, which are associated with virtual destination 150, based on the type of the information session (220). Upon selecting the destination, communication network 110 initiates the information session between communication device 101 and the selected destination (230).

Referring back to FIG. 1, communication device 101 could comprise any device having a communication interface programmed to function as a telecommunications device. The communication interface typically includes hardware and circuitry configured to exchange communications with other devices. Communication device 101 may also include a user interface, memory, software, a display, processing circuitry, a power supply, structural support, or other components. For example, communication device 101 could comprise a telephone, transceiver, mobile phone, cellular phone, smartphone, computer, server, personal digital assistant (PDA), e-book, game console, mobile Internet device, network interface card, media player, or some other communication apparatus, including combinations thereof.

Communication protocols that may be utilized by communication device 101 include Ethernet, Code Division Multiple Access 1xRTT (CDMA), Global System for Mobile communications (GSM), Universal Mobile Telecommunications System (UMTS), Evolution-Data Optimized (EV-DO), EV-DO rev. A, Third Generation Partnership Project Long Term Evolution (3GPP LTE), Worldwide Interoperability for Microwave Access (WiMAX), IEEE 802.11 protocols (Wi-Fi), High Speed Packet Access (HSPA), Bluetooth, Internet, telephony, or any other network protocol that facilitates communication between communication device 101 and communication network 110.

Communication network 110 comprises the core network of a communication services provider. Communication network 110 further comprises communication system 130. Communication network 110 may also include communication circuitry, routers, gateways, telecommunication switches, software, servers, computer systems, processing systems, or other communication equipment and systems for providing communication and data services, including combinations thereof. Communication network 110 may also utilize optical networks, asynchronous transfer mode (ATM) networks, packet networks, radio access networks (RAN), local area networks (LAN), metropolitan area networks (MAN), wide area networks (WAN), or other network equipment or systems, including combinations thereof.

Communication system 130 comprises a communication interface and a processor. Communication system 130 may also include other components such as memory, computing components, a communication interface, circuitry, a router, a power supply, structural support, or other components. Communication system 130 may reside in a single device or may be distributed across multiple devices. Communication system 130 may be contained within communication network 110 as illustrated in FIG. 1 or may exist outside of communication network 110 and communicate with communication network 110 via a link. Communication system 130 may be a discrete system or may be integrated within other systems, including other systems within communication network 110. In some examples, communication system 130 could be implemented in the form of a server, computer, data distribution system, database, or some type of computing platform, including combinations thereof.

Virtual destination 150 is a destination identifier which is associated with fixed or geographic destinations. In this case, virtual destination 150 is associated with destination 152 and destination 154. Destination 152 and destination 154 comprise a communication interface. The communication interface typically includes hardware or circuitry configured to exchange communications with other devices. Destination 152 and destination 154 may also include memory, software, processing circuitry, a switch, a router, or other components. For example, destination 152 and destination 154 could comprise a telephone, transceiver, computer, server, Internet device, network interface card, or some other communication apparatus, including combinations thereof. Each of destination 152 and destination 154 are associated with an information service which provides information of various types to requesters.

Communication device 101 is configured to communicate with communication network 110 over link 109. Link 109 may be a metallic link, wireless link, optical link, or combination thereof. Link 109 may be configured to use time-division multiplexing (TDM), Internet Protocol (IP), Ethernet, optical networking, wireless protocols, communication signaling, or some other communication format, including combinations thereof. In some examples, link 109 may include routers, networks, servers, access nodes, or associated equipment for establishing communication between communication device 101 and communication network 110.

Destination 152 and destination 154 are configured to communicate with communication network 110 over link 116 and link 118, respectively. Link 116 and link 118 may each be a metallic link, wireless link, optical link, or combination thereof. Link 116 and link 118 may be configured to use time-division multiplexing (TDM), Internet Protocol (IP), Ethernet, optical networking, wireless protocols, communication signaling, or some other communication format, including combinations thereof. In some examples, links 116 and 118 may include routers, networks, servers, access nodes, or associated equipment for establishing communication between communication network 110 and destinations 152 and 154.

It should be understood that an information session between a communication device and a destination may comprise a series of individual or discrete text messages or other similar types of communications. The text messages make up a communication session even though the sending of the text messages may be separated by periods of time with no other communications or interactions occurring during those periods of time.

Figure 3:
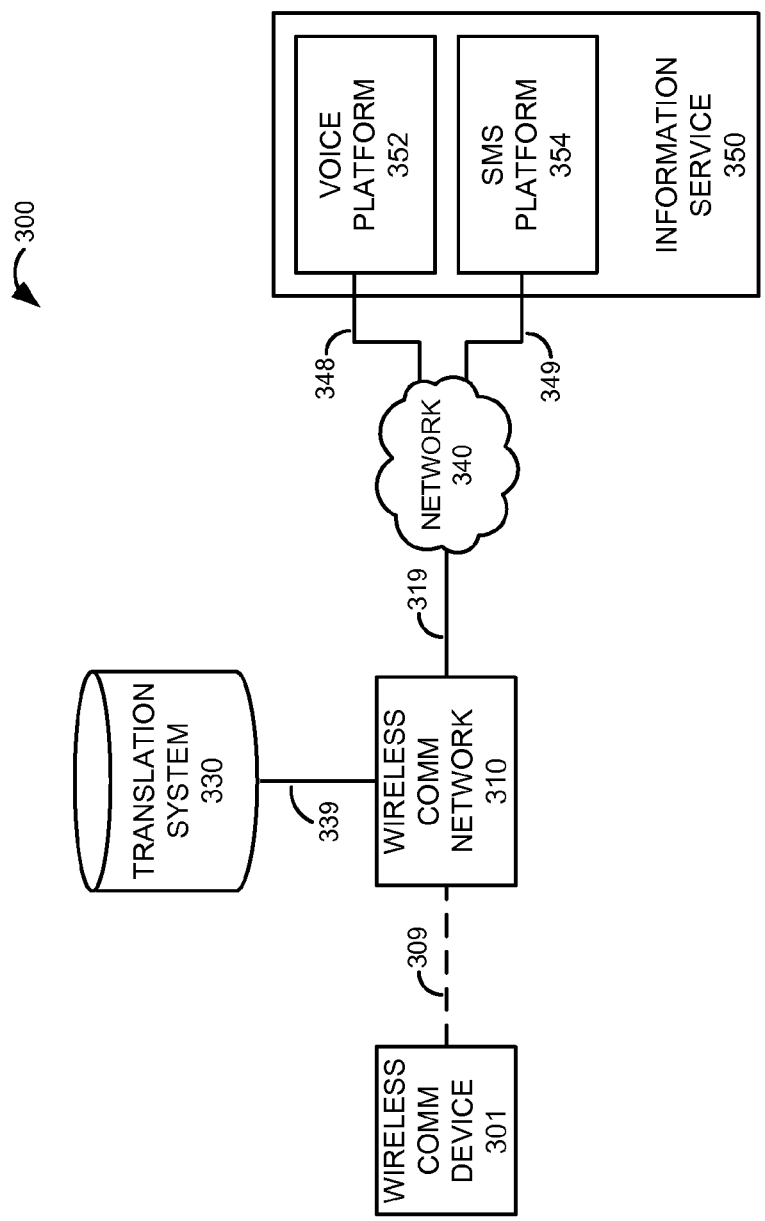
FIG. 3 illustrates a wireless communication architecture which utilizes a translation system.

FIG. 3 illustrates wireless communication architecture 300 which utilizes a translation system. Wireless communication architecture 300 is an example of communication architecture 100, although wireless communication architecture 300 may use an alternate configuration or operate in an alternate manner. Wireless communication architecture 300 comprises wireless communication device 301, wireless communication network 310, translation system 330, network 340, and information service 350.

Wireless communication device 301 is an example of communication device 101 although wireless communication device 301 may have an alternate configuration or operate in an alternate manner. Wireless communication device 301 communicates with wireless communication network 310 over wireless communication link 309. Wireless communication link 309 uses the air or space as the transport medium. Wireless communication link 309 may use various protocols, such as CDMA, GSM, UMTS, HSPA, EV-DO, EV-DO rev. A, 3GPP LTE, WiMAX, Wi-Fi, Bluetooth, Internet, telephony, or some other communication format, including combinations thereof. Wireless communication link 309 may comprise many different signals sharing the same link. For example, wireless communication link 309 could include multiple signals operating in a single propagation path comprising multiple communication sessions, frequencies, timeslots, transportation ports, logical transportation links, network sockets, IP sockets, packets, or communication directions, including combinations thereof.

Wireless communication network 310 is an example of communication network 110 although wireless communication network 310 may have an alternate configuration or operate in an alternate manner. Wireless communication network 310 may also include other devices such as a base station, an antenna, a gateway, a radio network controller, or other devices. Wireless communication network 310 communicates with information service 350 through network 340. Network 340 may be an Internet, intranet, dedicated network, wireless network, local area network, or other type of network, including combinations thereof.

Translation system 330 is an example of communication system 130 although translation system 330 may have an alternate configuration or operate in an alternate manner. Translation system 330 may comprise any type of device which receives a request from wireless communication network 310 indicating a virtual destination and performs a lookup or translation process based on the virtual destination. Translation system 330 responds to the request with a geographical destination which is associated with the virtual destination. Translation system 330 may be a service control point (SCP), database, server, or some other type of computing device, including combinations thereof.

Information service 350 may comprise any type of system or operation which provides information in response to requests from wireless communication device 301, from a person, or from some other type of communication device. Information service 350 comprises voice platform 352 and short message service (SMS) platform 354. Information service 350 is illustrated in FIG. 3 as a single device or entity but could comprise functions which are spread across multiple systems or geographic locations. Information service 350 may also contain additional communication platforms of various types.

Voice platform 352 comprises any type of system or operation for providing information in response to requests made though wireless communication device 301, or some other device, in voice format. Voice platform 352 could be a call center staffed by call agents, a computer, a voice recognition information lookup system, or other system through which communications are made using voice. SMS platform 354 comprises any type of system or operation for providing information in response to requests from wireless communication device 301, or some other communication device, in SMS format. SMS platform 354 may be a computer, server, or other system which is configured to communicate using SMS messages. Voice platform 352 and SMS platform 354 are illustrated in FIG. 3 as being in the same physical location but could be implemented in different systems or at different physical locations.

Voice platform 352 and SMS platform 354 are configured to communicate with wireless communication network 310 through network 340 over links 319, 348, and 349. Links 319, 348, and 349 may each be a metallic link, wireless link, optical link, or combination thereof. Links 319, 348, and 349 may be configured to use time-division multiplexing (TDM), Internet Protocol (IP), Ethernet, optical networking, wireless protocols, communication signaling, or some other communication format, including combinations thereof. In some examples, links 319, 348, and 349 may include routers, networks, servers, access nodes, or associated equipment for establishing communication between wireless communication network 310, voice platform 352, and SMS platform 354.

Figure 4:
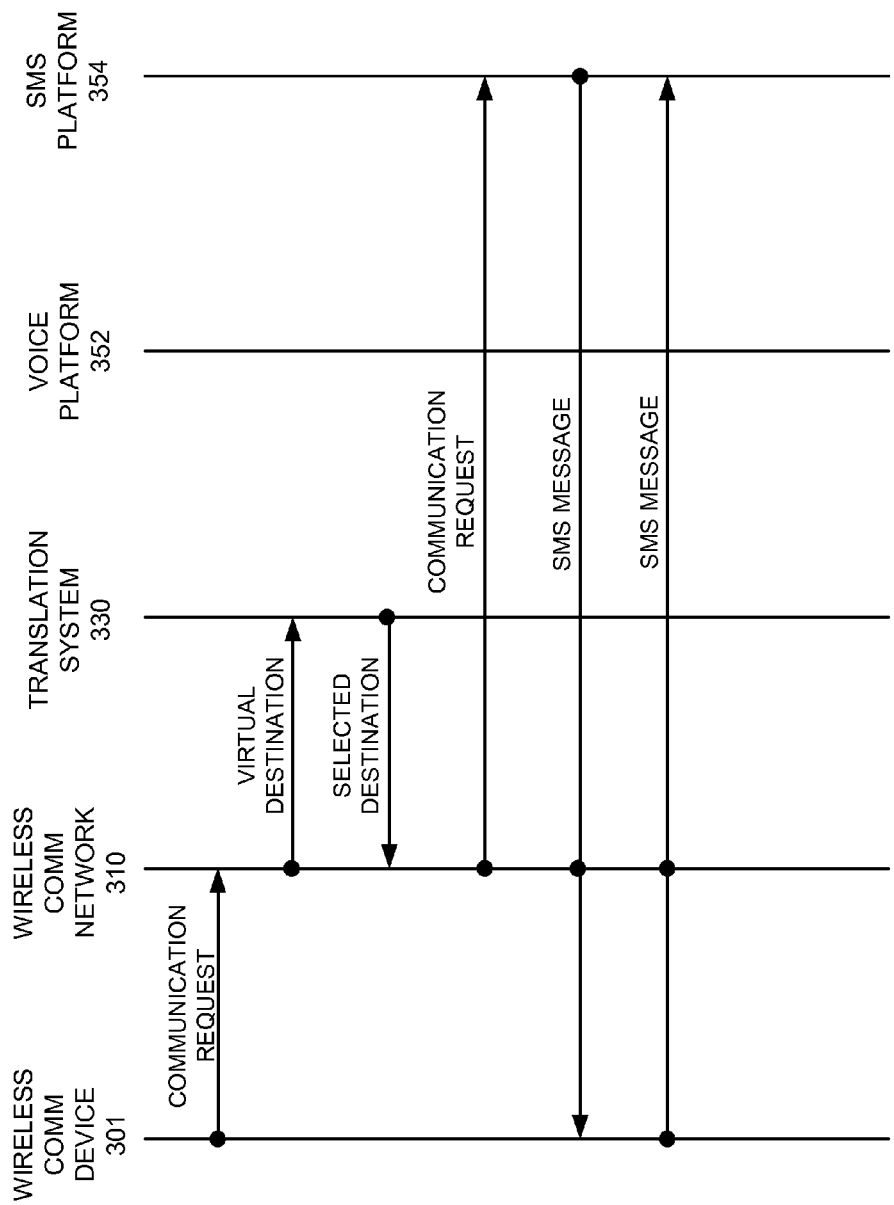
FIG. 4 illustrates an operation of a communication architecture using short message service (SMS) communications.

FIG. 4 illustrates one example of operation of wireless communication architecture 300. A user of wireless communication device 301 transmits a communication request to wireless communication network 310. The purpose of the requested communication is to establish an interactive text message session to obtain a bank account balance or other banking information. The communication request is made in the form of a text message from wireless communication device 301 to a toll free telephone number.

Wireless communication device 301 transmits the communication request, including the text message and the toll free telephone number, to wireless communication network 310. Wireless communication network 310 processes the request and the toll free number and determines that it is a virtual number which is associated with a virtual destination. In other words, communication network 310 determines that the toll free number is not associated with a geographical destination. Consequently, wireless communication network 310 sends a request to translation system 330 including the toll free number.

The toll free number is used by information service 350, the bank in this case, in order to allow customers to access information about their accounts without incurring additional phone charges. In North America, toll free numbers are often called "1-800" numbers because "800" was the original area code associated with these numbers. Now, toll free numbers also use other area codes including 888, 877, 866, and 855, and may include others in the future.

Since the toll free number is a virtual number, it enables calls to the toll free number to be routed to different geographic destinations at different points in time without changing the number called by the customer. The bank communicates the availability of the toll free number to customers without making a distinction as to whether the toll free number may be used for voice requests, text requests, or both. Typically, the translation system or an SCP performs a lookup or translation process to determine a geographical phone number or location which is associated with the toll free number. Typically, one destination is associated with each toll free number at any one point in time. The translation system typically performs the lookup or translation process to determine the geographical number based only on the toll free number.

In this case, translation system 330 performs the translation process based on the toll free number and the type of communication which is being initiated, a text communication session in this case. More than one destination is associated with the toll free number. Translation system 330 selects the associated destination which is configured to receive text based communications. In this example, the appropriate platform for text communications is SMS platform 354. Translation system 330 transfers information, which indicates that SMS platform 354 is the destination, to wireless communication network 310. Wireless communication network 310 initiates a communication session between wireless communication device 301 and SMS platform 354.

In this way, a single toll free number can be used by a customer to initiate both voice and text communications. The customer does not need to make a selection or take any further step to indicate the type of communication session he is initiating. The bank is able to provide this single toll free telephone number which customers may use contact the bank's information services regardless of communication method. A single number may be simpler for customers, reduce costs for the bank, eliminate the need to publish and communicate new phone numbers when new communication methods are implemented, or have other benefits.

Returning to FIG. 4, the communication request associated with the text message is transferred to SMS platform 354. This initiates a communication session between wireless communication device 301 and SMS platform 354. In response to establishing this communication session, SMS platform 354 transmits an SMS message to wireless communication device 301 through network 340 and wireless communication network 310. This SMS message contains information responding to the request or further information about how to initiate the request for information. For example, the SMS message may instruct the user to submit a user identification and password in order to access the account.

In response to the SMS message from SMS platform 354, wireless communication device 301 transmits another SMS message to SMS platform 354 through wireless communication network 310 and network 340. This exchange of SMS messages may continue until the user of wireless communication device 301 has received the desired information or until the communication session is otherwise terminated. Although the user initiated the communication session to a toll free number which is also capable of receiving voice communications, the message was routed directly to SMS platform 354 and required no voice interactions or communications to establish the communication session or get it routed to the proper platform.

In an alternative to the operation illustrated in FIG. 4, a customer may initiate a voice call to the same toll free number associated with FIG. 4. The voice call will be connected to voice platform 352 which is associated with the toll free number. When translation system 330 performs the translation process, the call will be recognized as a voice call. Translation system 330 determines that the toll free number is associated with information service 350. Further, translation system 330 determines that the call type is a voice call. Translation system 330 selects voice platform 352, based on the toll free number and the fact that it is a voice call, and initiates the communication.

Figure 5:
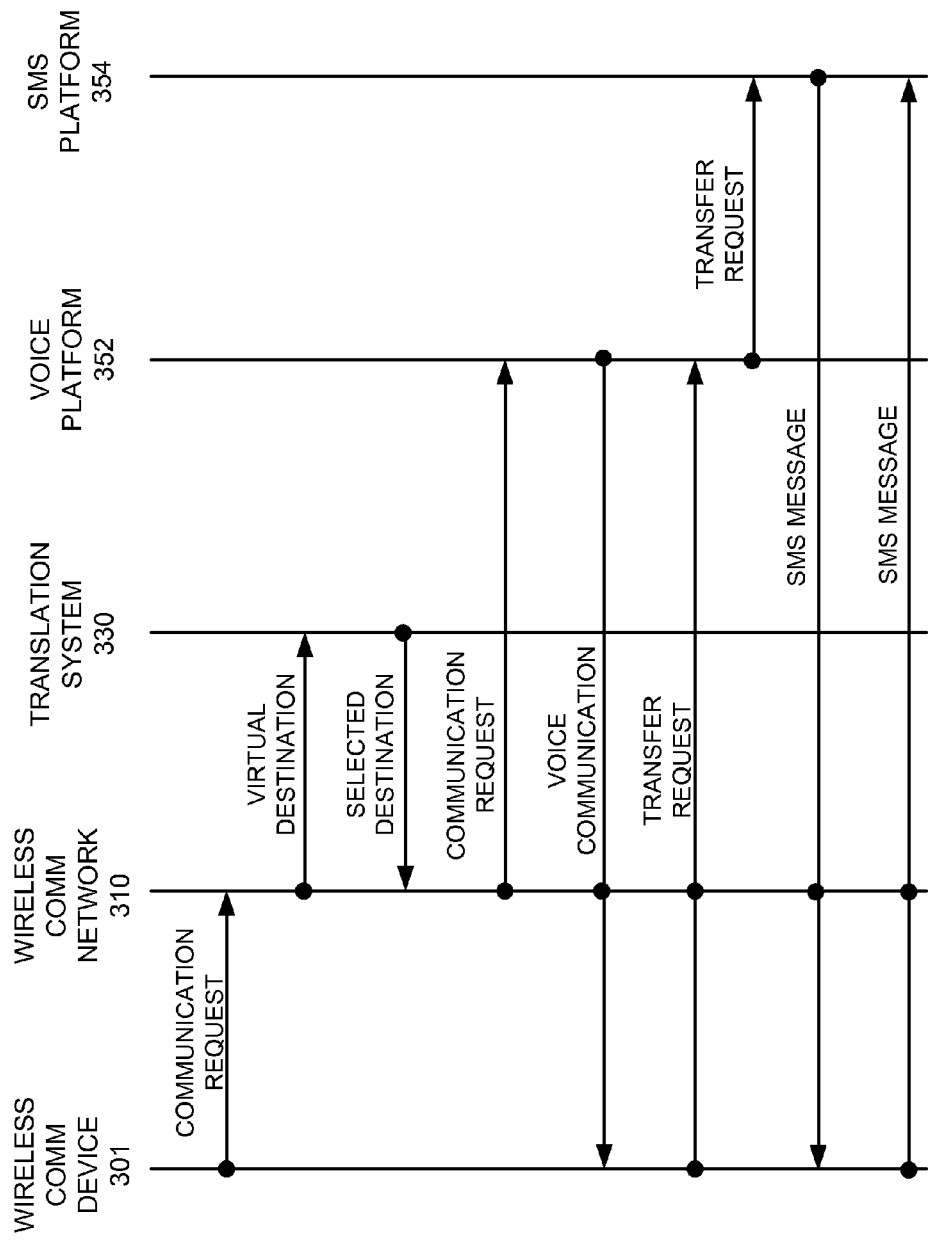
FIG. 5 illustrates an operation of a communication architecture using voice communications and SMS communications.

FIG. 5 illustrates a variation of the operation of wireless communication architecture 300 involving both voice communications and SMS communications. In this example, the user of communication device 301 places a voice call to the toll free number associated with the bank. In this situation, the user is typically expecting to speak to a live call agent, be connected to a system in which he can leave a voice message, or be connected to a system which performs automated recognition of voice requests. This process may also involve selections through use of an audible menu, phone tree, or other similar process. Selections in these types of menus may be made through voice commands, by communicating selections made through keys on wireless communication device 301 using dual-tone multi-frequency (DTMF) signaling, or through other means.

Wireless communication network 310 transfers the toll free number, or virtual destination, to translation system 330 along with the call type. Translation system 330 determines that the appropriate destination for the call is voice platform 352 based on the toll free number and the fact that it is a voice call. Translation system 330 may make this determination based on specific information indicating the call is a voice call or may make this determination in default based on the absence of information indicating it is a text message or other type of data-based communication. Wireless communication network 310 then initiates a voice call between wireless communication device 301 and voice platform 352.

Continuing with FIG. 5, the user of communication device 301 transmits a transfer request during the course of the voice communication session. The purpose of the transfer request is to initiate a transfer of the communication session from voice platform 352 to an SMS platform. The transfer request is transmitted to voice platform 352 through wireless communication network 310 and network 340 during the course of the active voice communication session. This request may be made by making an audible voice request, a menu selection, an automated response, or by some other means.

In response to the transfer request from communication device 301, voice platform 352 transmits the transfer request to SMS platform 354. Within information service 350, the communication session is transferred from voice platform 352 to SMS platform 354. After taking over the communication session, SMS platform 354 sends an SMS message to wireless communication device 301. At this point, the SMS message exchange continues between wireless communication device 301 and SMS platform 354 in a manner similar to that illustrated in FIG. 4.

In this way, a caller who has started a voice communication session with an information service may transition that communication session to a text based communication without breaking the communication session or calling a second number. This may be convenient for a caller who started the interaction as a voice session but no longer wishes to continue a voice interaction or is unable to do so.

Conversely, a communication session which is initiated as a text communication session, like the example in FIG. 4, may be transitioned to a voice communication session in a manner similar to that illustrated in FIG. 5. This may be desired because it is requested by the user, because the system determines that the user's communication device is not compatible with some aspect of the requested text communication process, or for other reasons.

FIG. 6 illustrates translation table 600 which may be used by communication system 130, translation system 330, or a similar translation system for selecting a destination. Translation table 600 contains destination information associated with two "800" toll free numbers which are virtual destinations. Typically, many more numbers would be included in a table of this type but only two numbers are shown for illustration purposes.

As indicated in translation table 600, the geographic destination associated with the first toll free telephone number, 800-555-1234, is a telephone number 555-555-2222. Since this first toll free number is only associated with voice and does not have text service available, the destination selection performed by the translation system will only be based on the virtual destination. Since only one destination is possible, all calls to that number will be routed to the destination, 555-555-2222.

In contrast, the second toll free telephone number, 800-555-5678, has two potential geographic destinations associated with it. The two potential destinations are 555-555-7777 and 555-555-8888. There are two destinations because this second toll free number is associated with an information service which is capable of supporting both voice and text services. One destination is associated with a voice platform which is capable of receiving and processing the voice calls and the other destination is capable of receiving and processing text messages. When the translation system selects a destination for this toll free telephone number, the selection is based on the toll free number as well as the session type. If 800-555-5678 is called using a voice call, the translation system will route the call to 555-555-7777. If a text message is sent to 800-555-5678, the translation system will route the message to 555-555-8888 based on the information in translation table 600. It should be understood that translation table 600 is illustrated for purposes of explaining one example of operation and many other types of tables or databases serving similar purposes are possible.

The examples above describe applications in which the information service has two platforms, a voice platform and an SMS platform. It should be understood that the methods, techniques, and systems described above are also applicable to systems which utilize platforms of different types to support other communication formats. A translation system could select between destinations associated with each of these platforms based on the virtual destination and the session type in a manner similar to the examples described above.

It should be further understood that the methods, techniques, and systems described above would also apply to information services which contain more than two platform types. A translation system could select between destinations associated with each of these platforms based on the virtual destination and the session type in a manner similar to the examples described above.

Although the examples above are primarily described with respect to toll free telephone numbers, it should be understood that the examples, systems, and methods described here also apply to other types of virtual phone numbers or virtual destinations. Some fee-based or pay-per-call numbers, often called "900" numbers, are virtual destinations and would be handled in a similar manner. In addition, an entity may implement virtual destinations within their own private communication network. These internal virtual destinations could be translated to actual destinations based on the communication type in a similar manner.

Figure 7:
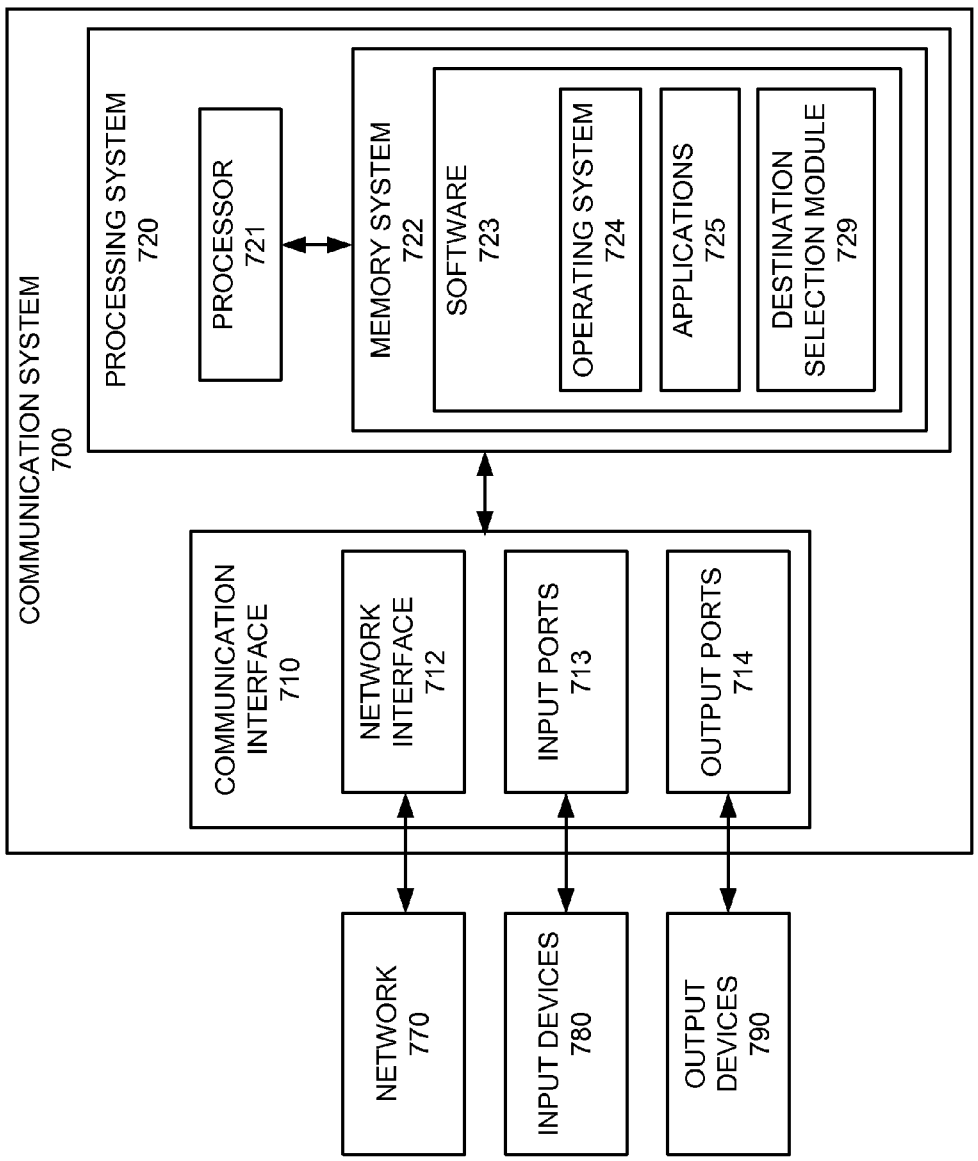
FIG. 7 illustrates a communication system.

FIG. 7 illustrates communication system 700. Communication system 700 includes communication interface 710 and processing system 720. Processing system 720 is linked to communication interface 710 through a communication link. Processing system 720 includes processor 721 and memory system 722.

Communication interface 710 includes network interface 712, input ports 713, and output ports 714. Communication interface 710 includes components that communicate over communication links, such as network cards, ports, RF transceivers, processing circuitry and software, or some other communication device. Communication interface 710 may be configured to communicate over metallic, wireless, or optical links. Communication interface 710 may be configured to use TDM, IP, Ethernet, optical networking, wireless protocols, communication signaling, or some other communication format, including combinations thereof. Communication interface 710 may have multiple network interfaces.

Network interface 712 is configured to connect to external devices over network 770. Network 770 is an example of network 340 although network 770 may have an alternate configuration or operate in an alternate manner. Input ports 713 are configured to connect to input devices 780 such as a keyboard, mouse, user interface, communication network, communication device, computer, or other input devices. Output ports 714 are configured to connect to output devices 790 such as a display, a printer, a communication network, a communication device, or other device.

Processor 721 includes microprocessor and other circuitry that retrieves and executes operating software from memory system 722. Memory system 722 comprises software 723. Memory system 722 may be implemented using random access memory, read only memory, a hard drive, a tape drive, flash memory, optical storage, or other memory apparatus.

Software 723 comprises operating system 724, applications 725, and destination selection module 729. Software 723 may also comprise additional computer programs, firmware, or some other form of non-transitory, machine-readable processing instructions. When executed by processor 721, software 723 directs processing system 720 to operate communication system 700 to select destinations as described herein. Processing system 720 receives a communication session request through communication interface 710 which has an information session type and indicates a virtual destination. The virtual destination is associated with at least two destinations which include a voice platform and a text message platform. Processing system 720 uses destination selection module 729 to select a destination based on the type of the information session. Processor 721 then initiates a communication session between a communication device and the selected destination.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication system to provide access to an information service, the method comprising:
   receiving a request for an information session between a communication device and a virtual destination identified in the request and associated with a plurality of service destinations that provide information for the information service;
   selecting a one destination of the plurality of service destinations by at least transmitting the request to a service control point (SCP) and receiving a response from the SCP indicating the one destination based on a type of the information session as initiated by the communication device, wherein the plurality of service destinations comprise at least a voice platform that provides the information in a voice format and a text message platform that provides the information in a text format, and wherein the type of the information session comprises one of at least a voice session and a text message session; and
   upon selecting the one destination, initiating the information session between the communication device and the one destination.

2. The method of claim 1 wherein the virtual destination is identified in the request by a toll free telephone number.

3. The method of claim 1 wherein the virtual destination is identified in the request by a non-geographic telephone number.

4. The method of claim 1 wherein the text message platform comprises a short message service (SMS) platform.

5. The method of claim 4 further comprising receiving a first text message from the SMS platform in response to initiating the information session.

6. The method of claim 5 further comprising transmitting a second text message to the SMS platform in response to the first text message.

7. The method of claim 1 wherein the one destination comprises the voice platform and further comprising transitioning the information session from the voice platform to the text message platform after the information session has been established between the communication device and the voice platform.

8. The method of claim 7 further comprising receiving a text message from the text message platform in response to transitioning the information session to the text message platform.

9. The method of claim 1 wherein the one destination comprises the text message platform and further comprising transitioning the information session from the text message platform to the voice platform after the information session has been established between the communication device and the text message platform.

10. A communication system for providing access to an information service, the communication system comprising:
    a communication interface configured to:
      receive a request for an information session between a communication device and a virtual destination identified in the request and associated with a plurality of service destinations that provide information for the information service; and
    a processor configured to:
      select a one destination of the plurality of service destinations by at least transmitting the request to a service control point (SCP) via the communication interface and receiving a response from the SCP indicating the one destination based on a type of the information session as initiated by the communication device, wherein the plurality of service destinations comprise at least a voice platform that provides the information in a voice format and a text message platform that provides the information in a text format, and wherein the type of the information session comprises one of at least a voice session and a text message session; and
      initiate the information session between the communication device and the one destination upon selecting the one destination.

11. The communication system of claim 10 wherein the virtual destination is identified in the request by a toll free telephone number.

12. The communication system of claim 10 wherein the virtual destination is identified in the request by a non-geographic telephone number.

13. The communication system of claim 10 wherein the communication interface is further configured to:

transmit the request to a service control point (SCP); and
receive a response from the SCP indicating the one destination.

14. The communication system of claim 10 wherein the text message platform comprises a short message service (SMS) platform.

15. The communication system of claim 14 wherein the SMS platform is configured to transmit a first text message to the communication device in response to the initiation of the information session.

16. The communication system of claim 10 wherein the one destination comprises the voice platform and the processor is further configured to transition the information session from the voice platform to the text message platform after the information session has been established between the communication device and the voice platform.

17. The communication system of claim 16 wherein the text message platform is configured to transmit a text message to the communication device in response to the transition of the information session.

18. The communication system of claim 10 wherein the one destination comprises the text message platform and the processor is further configured to transition the information session from the text message platform to the voice platform after the information session has been established between the communication device and the text message platform.

19. A method of operating a communication system to provide access to an information service, the method comprising:

transmitting a request for an information session from a communication device, wherein the request identifies a virtual destination which is associated with a plurality of service destinations that provide information for the information service;

receiving the request;

selecting a one destination of the plurality of service destinations by at least transmitting the request to a service control point (SCP) and receiving a response from the SCP indicating the one destination based on a type of the information session as initiated by the communication device, wherein the plurality of service destinations comprise at least a voice platform that provides the information in a voice format and a text message platform that provides the information in a text format, and wherein the type of the information session comprises one of at least a voice session and a text message session;

upon selecting the one destination, initiating the information session between the communication device and the one destination; and transmitting a communication from the communication device to the one destination.

* * * * *